(12) United States Patent
Cahan et al.

(10) Patent No.: US 10,694,373 B2
(45) Date of Patent: Jun. 23, 2020

(54) PRIVACY PROTECTION OF IMAGES IN ONLINE SETTINGS

(71) Applicant: International Business Machines Corporation, Armonk, NY (US)

(72) Inventors: Amos Cahan, Dobbs Ferry, NY (US); Ruchi Mahindru, Elmsford, NY (US); Valentina Salapura, Chappaqua, NY (US); Syed Yousaf Shah, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/845,171

(22) Filed: Dec. 18, 2017

(65) Prior Publication Data

US 2019/0191300 A1 Jun. 20, 2019

(51) Int. Cl.
| | | |
|---|---|---|
| *G06F 21/00* | (2013.01) | |
| *H04W 12/02* | (2009.01) | |
| *G06K 9/00* | (2006.01) | |
| *G06T 7/00* | (2017.01) | |
| *G06F 16/9535* | (2019.01) | |
| *H04L 29/06* | (2006.01) | |
| *G06F 21/60* | (2013.01) | |
| *G06F 21/62* | (2013.01) | |

(52) U.S. Cl.
CPC ........ *H04W 12/02* (2013.01); *G06F 16/9535* (2019.01); *G06F 21/60* (2013.01); *G06F 21/62* (2013.01); *G06F 21/6245* (2013.01); *G06F 21/6254* (2013.01); *G06K 9/00221* (2013.01); *G06K 9/00362* (2013.01); *G06T 7/0002* (2013.01); *H04L 63/168* (2013.01); *G06T 2207/30196* (2013.01)

(58) Field of Classification Search
CPC ...... G06F 21/60; G06F 21/62; G06F 21/6209; G06F 21/6218; G06F 21/6245; G06F 21/6254; G06F 21/6263; G06F 21/6272; G06F 21/32; G06F 21/30
See application file for complete search history.

(56) References Cited

U.S. PATENT DOCUMENTS

| | | | | |
|---|---|---|---|---|
| 9,396,354 B1 * | 7/2016 | Murphy | ............... | G06F 21/6245 |
| 2016/0381013 A1 * | 12/2016 | Buscemi | ................ | H04L 63/10 726/4 |

OTHER PUBLICATIONS

Baden, Randy et al.; "Persona: An Online Social Network with User-Defined Privacy"; SIGCOMM '09; Aug. 17-21, 2009; Barcelona, Spain; Copyright 2009 ACM; pp. 12.

(Continued)

*Primary Examiner* — Edward Zee
(74) *Attorney, Agent, or Firm* — Kenneth Han

(57) ABSTRACT

A system, method and program product for providing online privacy of image data. A centralized image privacy service is disclosed that includes: a user interface for allowing users to configure privacy profiles and provide profile images; an image scanning system that scans participating online sites for image data that matches the profile images; and a detection response system that determines a responsive action in response to a detected match based on an associated privacy profile, wherein the responsive action includes sending a masking request to the participating online site where the detected match occurred.

20 Claims, 4 Drawing Sheets

(56) References Cited

OTHER PUBLICATIONS

Buchegger, Sonja et al.; "PeerSoN: P2P Social Networking—Early Experiences and Insights"; EuroSys 09; Mar. 31, 2009; Nuremberg, Germany; Copyright 2009 ACM; pp. 7.

Cutillo, Leucio Antonio et al.; "Safebook: A Privacy-Preserving Online Social Network Leveraging on Real-Life Trust"; IEEE Communications Magazine; Dec. 2009; Copyright 2009 IEEE; pp. 94-101.

Guha, Saikat et al.; "NOYB: Privacy in Online Social Networks"; WOSN '08; Aug. 18, 2008; Washington, USA; Copyright 2008 ACM; pp. 49-54.

Llia, Pangiotis et al.; "Face/Off: Preventing Privacy Leakage From Photos in Social Networks"; CCS '15; Oct. 12-16, 2015; Denver, Colorado; Copyright held by owner/author; pp. 12.

Longley, Robert; "Does the Do-Not-Call List Work or Not?"; ThoughtCo.; Mar. 18, 2017; Printed Dec. 18, 2017; pp. 2; <https://www.thoughtco/does-the-do-not-call-list-work-3321174?print>.

Winkler, Thomas et al.; "Security and Privacy Protection in Visual Sensor Networks: A Survey"; ACM Computing Surveys; vol. 0; No. 0; Article 0; Publication Date 2014; Copyright 2014 ACM; pp. 39.

Yuan, Lin et al.; "Privacy-preserving photo sharing based on a secure JPEG"; IEEE Xplore; Aug. 6, 2015; Conference Date Apr. 26-May 1, 2015 in Hong Kong, China; pp. 3.

Unknown; "OptOutPrescreen.com"; Copyright 2017 Opt Out Services LLC; pp. 1.

\* cited by examiner

PRIVACY PROTECTION OF IMAGES IN ONLINE SETTINGS

TECHNICAL FIELD

The subject matter of this invention relates to privacy protection and more particularly to a masking service adapted to protect the privacy of images in online settings.

BACKGROUND

With the widespread use of camera equipped smart phones, it is difficult for individuals to avoid being photographed and/or video recorded, and having their photos distributed or uploaded on social media, even when not desired. Also, it is difficult to track all the online location where the image data may appear or be uploaded. Such image data can reveal private information that is not intended to be shared. For example, pictures can act as an identifier of an individual's social activities, schedule, location, relationships and other private information (e.g., home town location, location of child's school/activities, etc.).

Further, private information can be indirectly inferred from image data. For example, if a person is a regular visitor of a location such as a specific restaurant, grocery shop, child's activity, entertainment center, etc., and some public pictures show that person's presence in these locations, then the person's personal schedule could be easily deduced.

Additionally, image data captured when a person is a bystander can likewise reveal a great amount of personal information that is not intended to be shared. Pictures taken in such circumstances, and shared, could be maliciously utilized to jeopardize the privacy and/or safety of the bystander. For instance, pictures of individuals collected over the Web were recently demonstrated to be a sufficient source of information to hack into biometric data-protected information. Unfortunately, no effective facility for controlling the present of image data in online environments exists.

SUMMARY

Aspects of the disclosure provide a platform to detect and protect against accidental personal information leakage of image data in online environments such as social media and the Web. Approaches include detecting in image data the presence of a user (or specified attributes that the user is trying to protect, e.g., a car, a pet, a house, a child, etc.) shared on social media or public web pages and selectively blocking the information.

The platform may be implemented utilizing a centralized system having a profile manager, where the user defines their privacy setting, and based on the privacy setting, a subscribing social media automatically takes some action relative to a detected image. Alternatively, a subscription service may be utilized that will search the web, alert the user when user-related visual information is detected and request user input on a course of action.

A user's privacy profile may be connected to third party applications, such as calendars, to control the response when image data is detected. For example, a user privacy profile can be configured to automatically pull attributes from the user's calendar and planner to, e.g., ascertain a location based on time of the day, day of the week, etc. Depending the ascertained information and profile settings, a predefined course of action may be implemented (e.g., allow the images to publish, block all images, check with the user, etc.).

A first aspect discloses a centralized image privacy service, including: a user interface for allowing users to configure privacy profiles and provide profile images; an image scanning system that scans participating online sites for image data that matches the profile images; and a detection response system that determines a responsive action in response to a detected match based on an associated privacy profile, wherein the responsive action includes sending a masking request to the participating online site where the detected match occurred.

A second aspect discloses an embedded image privacy service implemented at an online site, comprising: a privacy profile manager that, periodically or on demand, accesses privacy profiles for users from a centralized profile service, wherein each privacy profile includes a profile image associated with a user; an image scanning system that scans image data being uploaded to the online site for image data that matches the profile image; and a detection response system that determines a responsive action in response to a detected match based on an associated privacy profile, wherein the responsive action includes masking uploaded image data.

A third aspect discloses a computer program product stored on a computer readable storage medium, which when executed by a computing system, provides a centralized image privacy service, the program product including: program code for allowing users to configure privacy profiles and provide profile images; program code that scans participating online sites for image data that matches the profile images; and program code that determines a responsive action in response to a detected match based on an associated privacy profile, wherein the responsive action includes sending a masking request to the participating online site where the detected match occurred.

In a fourth aspect, the invention provides a computer program product stored on a computer readable storage medium, which when executed by a computing system, provides an embedded image privacy service, the program product including: program code that, periodically or on demand, accesses privacy profiles for users from a centralized profile service, wherein each privacy profile includes a profile image associated with a user; program code that scans image data being uploaded to an online site for image data that matches the profile image; and program code that determines a responsive action in response to a detected match based on an associated privacy profile, wherein the responsive action includes masking uploaded image data.

In a fifth aspect, the invention provides a method for implementing a centralized image privacy service, including: providing a user interface for allowing users to configure privacy profiles and provide profile images; scanning participating online sites for image data that matches the profile images; and determining a responsive action in response to a detected match based on an associated privacy profile, wherein the responsive action includes sending a masking request to the participating online site where the detected match occurred.

In a sixth aspect, the invention provides a method for implementing an embedded image privacy service, including: periodically or on demand, accessing privacy profiles for users from a centralized profile service, wherein each privacy profile includes a profile image associated with a user; scanning image data being uploaded to the online site for image data that matches the profile image; and determining a responsive action in response to a detected match based on an associated privacy profile, wherein the responsive action includes masking uploaded image data.

BRIEF DESCRIPTION OF THE DRAWINGS

These and other features of this invention will be more readily understood from the following detailed description of the various aspects of the invention taken in conjunction with the accompanying drawings in which.

Figure 1:
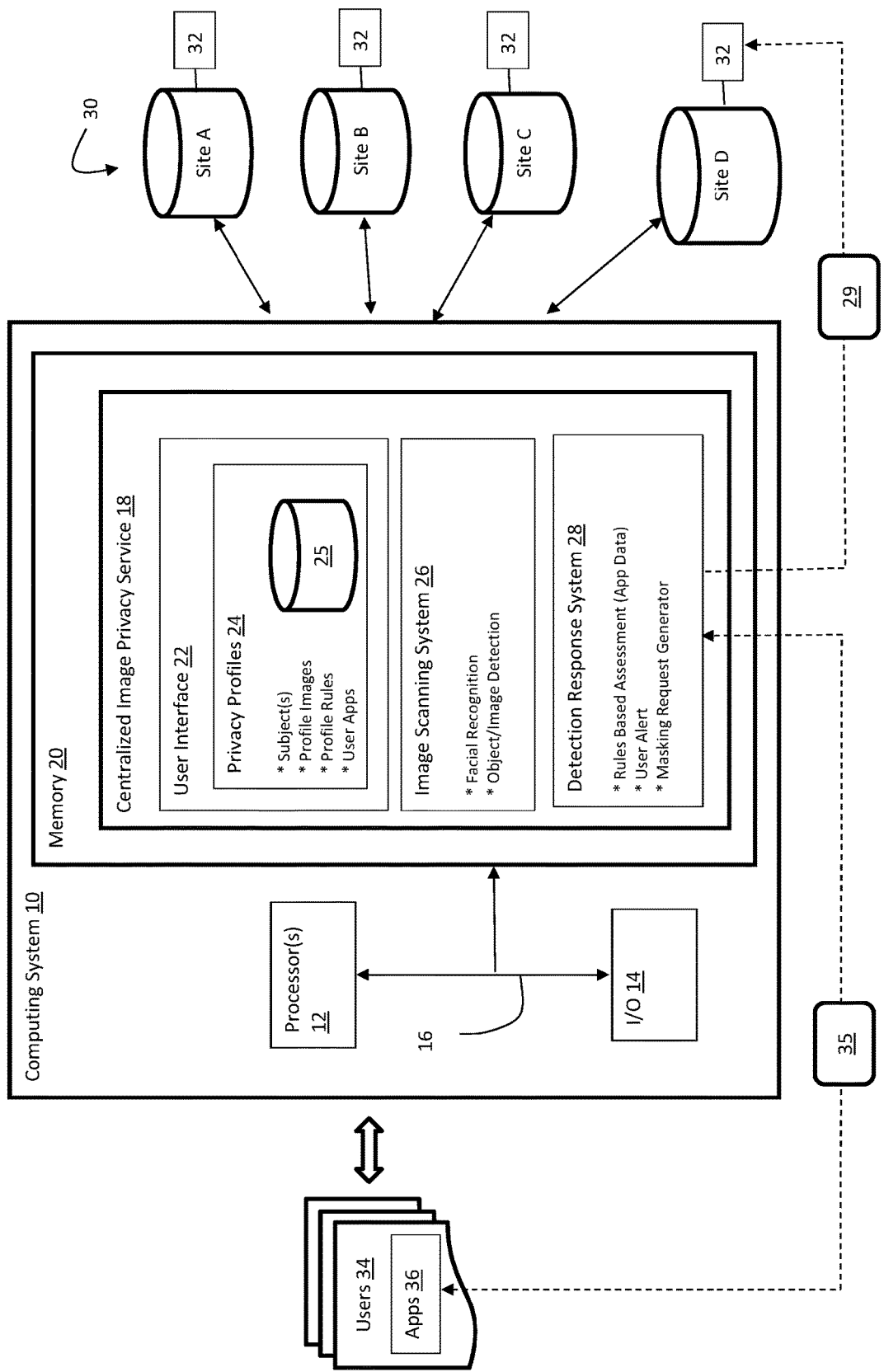
FIG. 1 shows a computing system having a centralized image privacy service according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a centralized image privacy service 18 that allows users 34 to control the unwanted publication and dissemination of image data on participating online sites 30 (e.g., websites, social media sites, etc.). Centralized image privacy service 18 includes a user interface 22 that allows a user 34 to establish a privacy profile 24 that is stored in a database 25. The profile settings 24 generally include:

(1) the identity of one or more subjects that the user want to protect (e.g., the user, the user's family, a license plate, etc.);

(2) profile images 25 of the subjects that can be used as training or baseline data for matching purpose;

(3) profile rules for each subject (i.e., circumstances when image publication is allowed/not allowed, desired response when an unwanted image is detected, etc.); and (4) user apps 36 (e.g., calendars, navigation apps, biometric sensor based apps, etc.) that can provide contextual information for the profile rules.

Once a privacy profile 52 is established, image scanning system 26 periodically or on demand scans image data stored at participating online sites 30 for any images that match stored profiles images 25. Image scanning system 26 may for example utilize any known facial recognition or object/image detection system.

When a match is detected, detection response system 28 identifies the associated user and analyzes the profile rules for the user to determine a responsive action. For example, for certain types of detected image data, the user 34 may simply allow publication of the image data. In other cases, the user 36 may want an alert (e.g., text message, email, etc.) telling the user 34 of a detected image at a given site. In response to the alert, the user may ask that a masking request 29 be sent to the site. Alternatively, a masking request 29 could be sent automatically to the site upon a detected match. Once generated and sent to a site (e.g., Site D), masking request 29 is processed by a masking request handler 32, e.g., installed, at each participating site 30. Masking request 29 may for example include the identity/location of the problematic image data (e.g., webpage, user account, etc.) and a requested action to be taken (e.g., remove the picture, blur the face, white out a region or certain pixels, etc.). Masking request handlers 32 can be implemented using any automated and/or manual process.

As noted, in some cases, the profile rules may dictate that a user app 36 be interrogated for contextual information 35. For example, the user app 36 may comprise a calendar that details the location of the user at different times and days. The rules may for example dictate that images collected at certain locations or at certain times should not be published. Accordingly, the detection response system 28 could determine the time a discovered picture was taken, and interrogate the calendar app to determine if the user 36 was at a proscribed location. In other cases, the user app 36 could include a GPS record of location information. Based on the location of the user at the time the image was taken, an appropriate response can be determined.

In still other cases, the user app 36 may utilize sensors to capture biometric data of the user, e.g., heartrate, temperature, movement, etc., from a smart watch, smart device, smart clothing, etc. In this manner, the profile rules could dictate that no image data be posted of the user 34 involved in exercising, driving, eating, drinking alcohol, etc.

Figure 2:
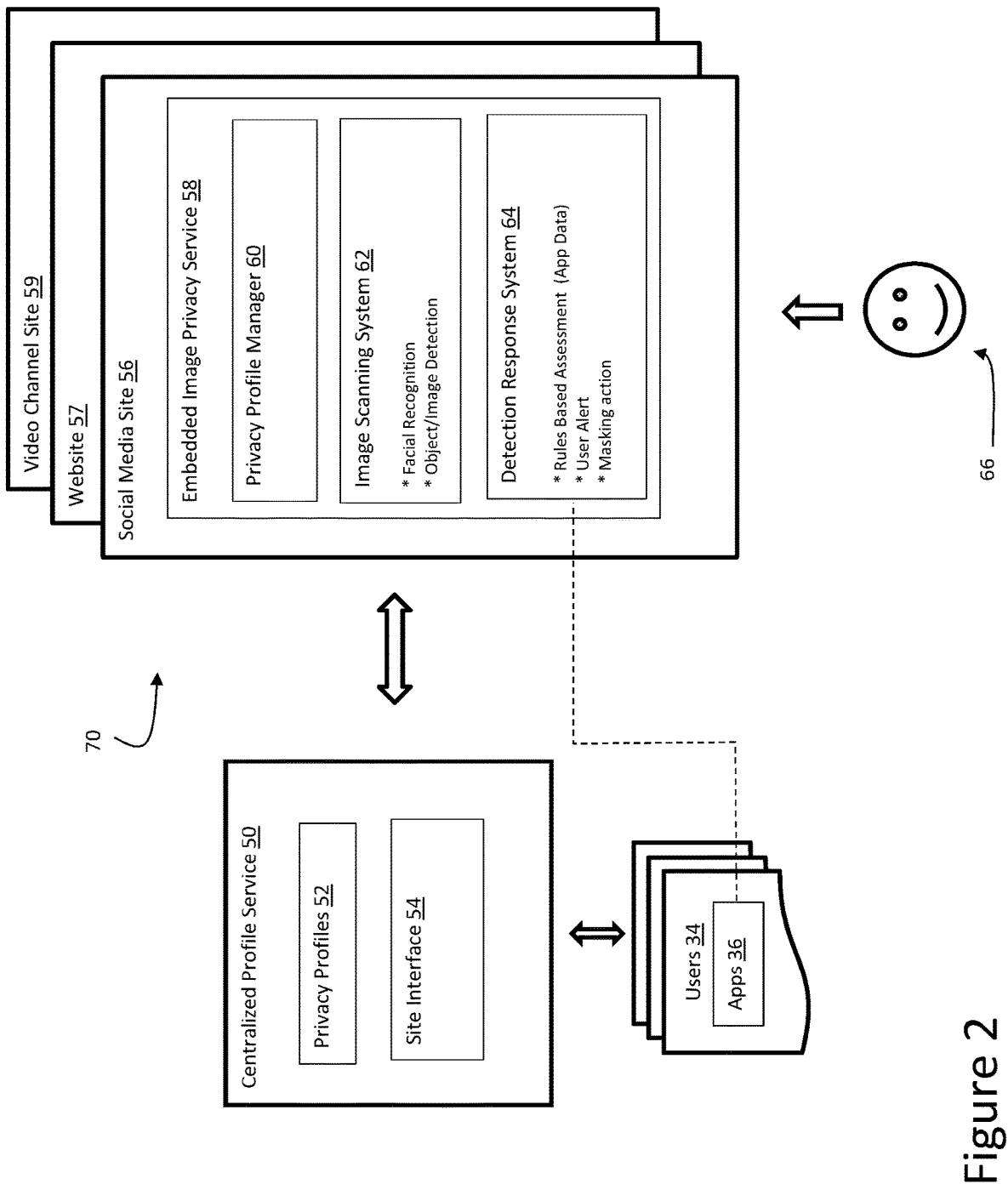
FIG. 2 shows an embedded image privacy service according to embodiments.

FIG. 2 depicts an alternative embodiment in which the privacy profiles 52 are maintained on a centralized profile service 50 and each participating individual online site 70 (e.g., social media site 56, website 57, video channel site 59, etc.) has its own instance of an embedded image processing service 58. In this embodiment, users 34 register with the centralized profile service 50 to create a privacy profile 52 (similar to that described in the FIG. 1 embodiment). However, in this case, the online sites 70 download or otherwise access the privacy profiles 52 via a site interface 54 and perform image detection locally.

In this example, embedded image privacy service 58 includes a privacy profile manager 60 that periodically or on demand downloads or accesses privacy profiles 52. An image scanning system 62 resident at the site performs facial recognition and image/object detection at the time image data 66 is being loaded to the site. Using this approach, problematic image data 66 can be detected and dealt with before it actually is loaded for public view. Like the previous embodiment, once private image data 66 is detected, detection response system 64 can implement the appropriate responsive action based on a rules based assessment. In the event a masking action is required (e.g., deny upload, blur face, whiteout a portion, etc.), the detection response system 64 can implement the process. Similar to the previous embodiment, user apps 36 can be interrogated for contextual information to supplement the profile rules when deciding on responsive actions.

Figure 3:
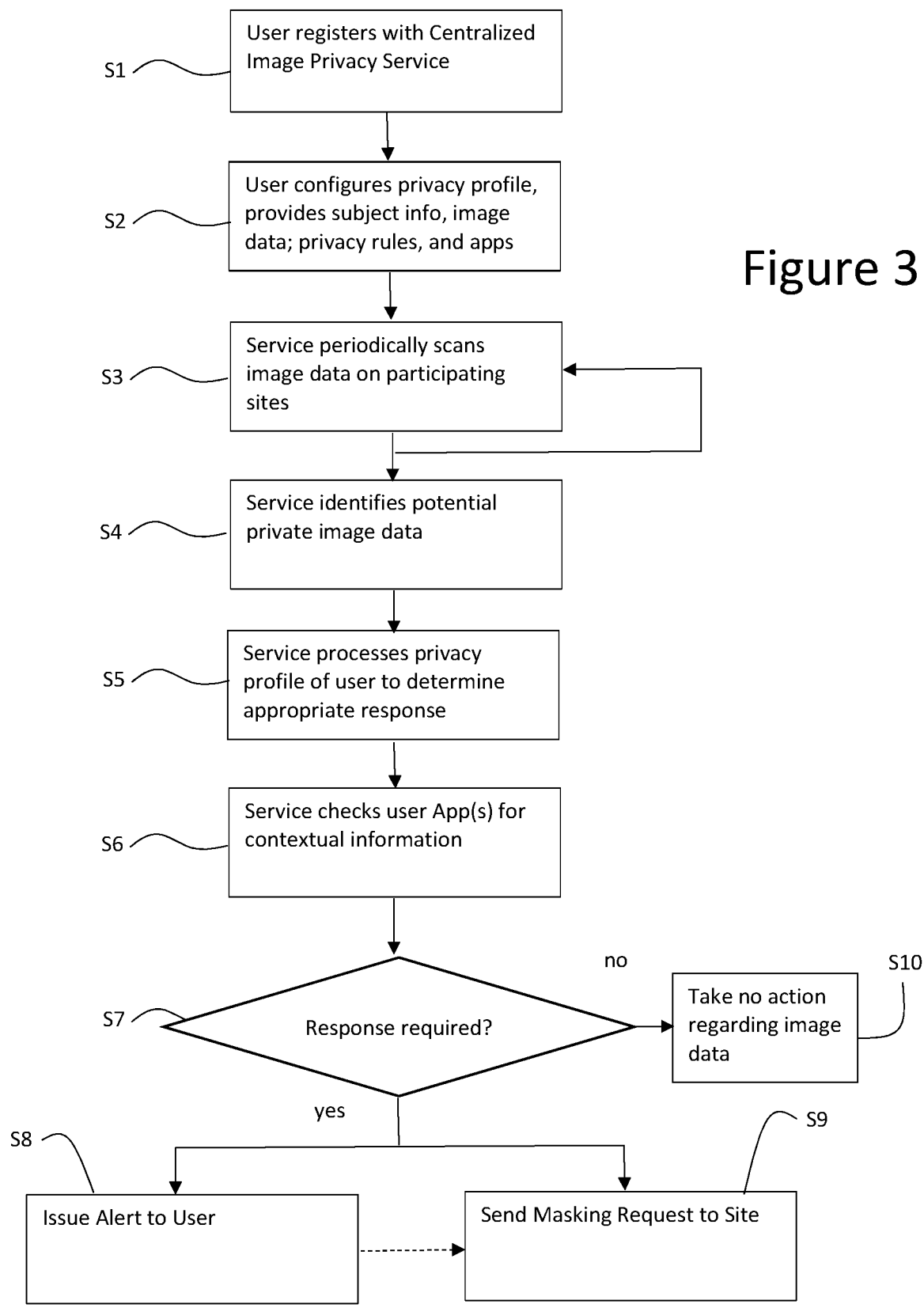
FIG. 3 shows a flow diagram of a method of implementing the central image privacy service according to embodiments.

FIG. 3 depicts a flow diagram of a process for implementing the centralized image privacy service 18 shown in FIG. 1. At S1, the user registers with the centralized image privacy service 18 and at S2 configures a privacy profile 24 that includes subject information, profile image(s), privacy rules and any associated apps 36. At S3, the service 18 periodically (or on demand) scans image data at participating sites 30 and at S4 the service 18 identifies potential private image data. At S5, the service processes the privacy profile 24 for the associated user 34 to determine an appropriate responsive action. At S6, the associated user apps 36 are checked as need for contextual information 35. At S7, a determination is made whether a response is required. If no, then no action is taken at S10. If yes, then either an alert is issued to the user 34 and/or a masking request 29 is sent to the appropriate site where the private image data was located.

Figure 4:
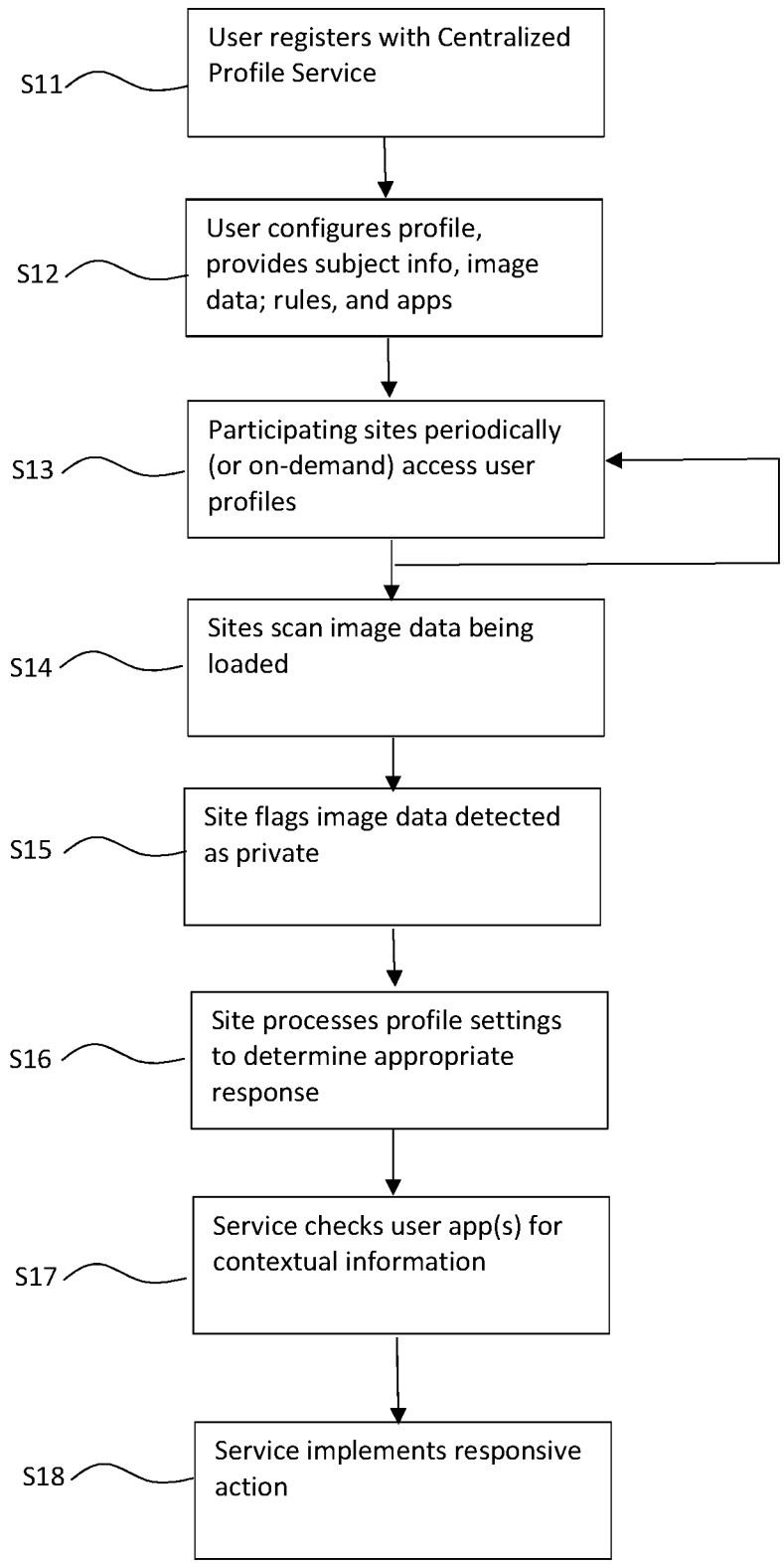
FIG. 4 shows a flow diagram of a method of implementing the embedded image privacy service according to embodiments.

FIG. 4 depicts a flow diagram of a process for implementing the embodiment shown in FIG. 2 that utilizes a centralized profile service 50 and an embedded image privacy services 58 at participating sites 70. At S11, the user 34 registers with the centralized profile service 50 and at S12, the user configures a privacy profile 52. Next, at S13, participating sites 70 periodically (or on demand) access privacy profiles 52 of registered users 34. At S14, each site scans image data being loaded onto its site and at S15, the site flags any image data that matches a profile image in the privacy profiles. When a match is detected, the site processes the privacy profile of the associated user 34 to determine the appropriate response at S16. In addition, the service 58 may check associated user apps 36 for contextual information at S17. Finally at S18, the appropriate responsive action is implemented (e.g., disallow upload of image data, blur image, white out portions, etc.).

It is understood that services 18, 50, 58 may be implemented as computer program products stored on a computer readable storage medium. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that services 18, 50 and 58 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A centralized image privacy servicing method, the method comprising:
    establishing privacy profiles using a user interface that allows users to configure the privacy profiles, wherein the privacy profiles comprise profile settings including: an identity of one or more subjects that the users want to protect, profile images of the subjects that are used as training or baseline data for matching purposes, profile rules for each of the subjects including circumstances when image publication is allowed or not allowed and desired response when an unwanted image is detected, and user apps that provide contextual information for the profile rules;
    scanning participating online sites for image data that matches the profile images using an image scanning system; and
    determining a responsive action in response to a detected match based on an associated privacy profile, wherein the responsive action is determined by using a detection response system to identify an associated user and analyze the profile rules corresponding to the associated user, wherein the responsive action includes sending a masking request to the participating online site where the detected match occurred.

2. The centralized image privacy servicing method of claim 1, wherein each privacy profile includes a set of rules for handing a detected match.

3. The centralized image privacy servicing method of claim 2, wherein the set of rules specifies at least one user app for obtaining the contextual information.

4. The centralized image privacy servicing method of claim 3, wherein the contextual information includes at least one of calendar data, location data, or biometric data.

5. The centralized image privacy servicing method of claim 1, wherein each participating online site includes a masking request handler for processing masking requests.

6. The centralized image privacy servicing method of claim 1, wherein the masking request includes a location of a matching image and a proposed action.

7. The centralized image privacy servicing method of claim 1, wherein the responsive action includes issuing an alert to the associated user.

8. An embedded image privacy servicing method implemented at an online site, the method comprising:
    accessing, periodically or on demand, privacy profiles for users from a centralized profile service using a privacy profile manager, wherein each privacy profile is established by a respective user and includes a profile image associated with the respective user, wherein each privacy profile comprises profile settings including: an identity of one or more subjects that the respective user wants to protect, profile images of the subjects that are used as training or baseline data for matching purposes, profile rules for each of the subjects including circumstances when image publication is allowed or not allowed and desired response when an unwanted image is detected, and user apps that provide contextual information for the profile rules;
    scanning image data being uploaded to the online site for image data that matches the profile images using an image scanning system; and
    determining a responsive action in response to a detected match based on an associated privacy profile, wherein the responsive action is determined by using a detection response system to identify an associated user and analyze the profile rules corresponding to the associated user, wherein the responsive action includes masking uploaded image data.

9. The embedded image privacy servicing method of claim 8, wherein each privacy profile includes a set of rules for handing a detected match.

10. The embedded image privacy servicing method of claim 9, wherein the set of rules specifies at least one user app for obtaining the contextual information.

11. The embedded image privacy servicing method of claim 10, wherein the contextual information includes at least one of calendar data, location data, or biometric data.

12. The embedded image privacy servicing method of claim 8, wherein masking uploaded image data includes one of blocking an upload, blurring the image data, or whiting out a portion of the image data.

13. The embedded image privacy servicing method of claim 8, wherein the responsive action includes issuing an alert to the associated user.

14. A computer program product stored on a non-transitory computer readable storage medium, which when executed by a computing system, provides a centralized image privacy service, the program product comprising:

program code for establishing privacy profiles and allowing users to configure the privacy profiles, wherein the privacy profiles comprise profile settings including: an identity of one or more subjects that the users want to protect, profile images of the subjects that are used as training or baseline data for matching purposes, profile rules for each of the subjects including circumstances when image publication is allowed or not allowed and desired response when an unwanted image is detected, and user apps that provide contextual information for the profile rules;

program code that scans participating online sites for image data that matches the profile images; and program code that determines a responsive action in response to a detected match based on an associated privacy profile, wherein the responsive action is determined by identifying an associated user and analyzing the profile rules corresponding to the associated user, wherein the responsive action includes sending a masking request to the participating online site where the detected match occurred.

15. The computer program product of claim 14, wherein each privacy profile includes a set of rules for handing a detected match.

16. The computer program product of claim 15, wherein the set of rules specifies at least one user app for obtaining the contextual information.

17. The computer program product of claim 16, wherein the contextual information includes at least one of calendar data, location data, or biometric data.

18. The computer program product of claim 14, wherein the masking request includes a location of a matching image and a proposed action.

19. The computer program product of claim 14, wherein the responsive action includes at least one of: removing the image data, blurring the image data or whiting out a portion of the image data.

20. The computer program product of claim 14, wherein the responsive action includes issuing an alert to the associated user.

* * * * *